United States Patent
Xu et al.

(10) Patent No.: US 11,322,153 B2
(45) Date of Patent: May 3, 2022

(54) CONVERSATION INTERACTION METHOD, APPARATUS AND COMPUTER READABLE STORAGE MEDIUM

(71) Applicant: Baidu Online Network Technology (Beijing) Co., Ltd., Beijing (CN)

(72) Inventors: Yunfei Xu, Beijing (CN); Guoguo Chen, Beijing (CN)

(73) Assignees: BAIDU ONLINE NETWORK TECHNOLOGY (BEIJING) CO., LTD., Beijing (CN); SHANGHAI XIAODU TECHNOLOGY CO. LTD., Shanghai (CN)

( * ) Notice: Subject to any disclaimer, the term of this patent is extended or adjusted under 35 U.S.C. 154(b) by 158 days.

(21) Appl. No.: 16/797,497

(22) Filed: Feb. 21, 2020

(65) Prior Publication Data

US 2021/0027788 A1 Jan. 28, 2021

(30) Foreign Application Priority Data

Jul. 23, 2019 (CN) .......................... 201910666945.X

(51) Int. Cl.
*G10L 15/32* (2013.01)
*G06F 40/35* (2020.01)
(Continued)

(52) U.S. Cl.
CPC .............. *G10L 15/32* (2013.01); *G06F 40/35* (2020.01); *G10L 15/1815* (2013.01);
(Continued)

(58) Field of Classification Search
None
See application file for complete search history.

(56) References Cited

U.S. PATENT DOCUMENTS

| 8,027,745 B1 | 9/2011 | Freeze |
| 2010/0299136 A1 | 11/2010 | Tong et al. |

(Continued)

FOREIGN PATENT DOCUMENTS

| CN | 105589848 A | 5/2016 |
| CN | 105845137 A | 8/2016 |

(Continued)

OTHER PUBLICATIONS

Jie Zeng et al., "A Dialogue System for Collecting User's Preference about Foods by Focusing on Taste and Texture," 32nd Annual Conference of the Japanese Society for Artificial Intelligence, 2018, 3 pages.

(Continued)

*Primary Examiner* — Nafiz E Hoque
(74) *Attorney, Agent, or Firm* — Faegre Drinker Biddle & Reath LLP

(57) ABSTRACT

A conversation interaction method and apparatus, and a computer-readable storage medium are provided. The method includes: converting a speech to be recognized into a first text; inputting the first text into a semantic analysis model, to obtain intention information and slot information of the first text; and inputting the intention information and the slot information of the first text into a conversation state machine, to obtain interaction information corresponding to the first text. By using a semantic analysis model, intention information and slot information of a first text are obtained directly from the first text. The process in the existing technology, where a semantic analysis model needs to be used immediately after a language model, is avoided, thereby shortening processing time and making it possible to respond faster to a user. Further, by using the above scheme, calculation complexity and the cost of a whole system are reduced.

15 Claims, 10 Drawing Sheets

(51) Int. Cl.
  *G10L 15/18* (2013.01)
  *G10L 15/22* (2006.01)
  *G10L 15/26* (2006.01)
(52) U.S. Cl.
  CPC .............. *G10L 15/22* (2013.01); *G10L 15/26* (2013.01); *G10L 2015/227* (2013.01); *G10L 2015/228* (2013.01)

(56) References Cited

U.S. PATENT DOCUMENTS

| | | | |
|---|---|---|---|
| 2016/0163314 A1* | 6/2016 | Fujii | G10L 13/027 704/275 |
| 2016/0202957 A1 | 7/2016 | Siddall et al. | |
| 2016/0328379 A1* | 11/2016 | Tsu | G06F 40/268 |
| 2017/0199867 A1 | 7/2017 | Koji et al. | |
| 2018/0143802 A1 | 5/2018 | Jang | |
| 2019/0179606 A1* | 6/2019 | Thangarathnam | G06F 40/30 |
| 2019/0286480 A1* | 9/2019 | Park | G06F 9/4843 |
| 2019/0295533 A1* | 9/2019 | Wang | G10L 15/1815 |
| 2020/0027456 A1* | 1/2020 | Kim | G10L 15/22 |

FOREIGN PATENT DOCUMENTS

| | | |
|---|---|---|
| CN | 107463301 A | 12/2017 |
| CN | 108804536 A | 11/2018 |
| CN | 108885870 A | 11/2018 |
| CN | 109003605 A | 12/2018 |
| CN | 110222162 A | 9/2019 |
| JP | 2008512789 A | 4/2008 |
| JP | 2008234443 A | 10/2008 |
| JP | 2010048980 A | 3/2010 |
| JP | 2015133047 A | 7/2015 |
| WO | 2016067418 A1 | 5/2016 |

OTHER PUBLICATIONS

Notice of Reasons for Refusal, Japanese Patent Application No. 2020-018248, dated Apr. 30, 2021, 8 pages with English translation.
Notification of First Office Action, Chinese Application No. 201910666945X to Baidu Online Network Technology (Beijing) Co., Ltd. et al., China National Intellectual Property Administration, dated Jun. 2, 2021, 6 pages with English Translation.
Search Report, Chinese Application No. 201910666945X to Baidu Online Network Technology (Beijing) Co., Ltd et al., China State Intellectual Property Office, dated May 26, 2021, 4 pages with English Translation.
The State Intellectual Property Office of People's Rebulic of China; Chinese Office Action and Search Report; Chinese Application No. 201910666945X; dated Feb. 7, 2022; 10 pages.
Japanese Patent Office; Japanese Office Action and Search Report; Japanese Application No. 2020-018248; dated Feb. 2, 2022; 8 pages.

* cited by examiner

CONVERSATION INTERACTION METHOD, APPARATUS AND COMPUTER READABLE STORAGE MEDIUM

CROSS-REFERENCE TO RELATED APPLICATION

This application claims priority to Chinese patent application No. 201910666945.X, filed on Jul. 23, 2019, which is hereby incorporated by reference in its entirety.

TECHNICAL FIELD

The present application relates to a field of artificial intelligence, and in particular, to a conversation interaction method, apparatus, and a computer-readable storage medium.

BACKGROUND

In recent years, artificial intelligence technology has developed rapidly, products related to intelligent speech technology have entered thousands of households. People are gradually used to talking with machines and have higher expectations for understanding and response capability of the machines.

Mainstream speech-based conversation interaction framework adopts an Automatic Speech Recognition (ALR) model and a Natural Language Understanding (NLU) model. The workflow includes converting a user's speech into a text through an ASR model firstly, and then performing a semantic analysis by using an NLU model, to finally obtain a user's intention.

The main problem of the existing method is that the workflow is divided into two parts. Once an error occurs in a recognition performed by using the ASR model, the error will be enlarged when adopting the NLU model. In addition, in a case where a model is large, the calculation amount by using an NLU model is large, the overall cost is high, and the recognition process will be delayed.

SUMMARY

A conversation interaction method and apparatus, and a computer-readable storage medium are provided according to embodiments of the application, to solve one or more technical problems in the existing technology.

In a first aspect, a conversation interaction method is provided according to an embodiment of the application. The method includes:

converting a speech to be recognized into a first text;

inputting the first text into a semantic analysis model, to obtain intention information and slot information of the first text; and inputting the intention information and the slot information of the first text into a conversation state machine, to obtain interaction information corresponding to the first text.

In an implementation, the method further includes:

inputting the first text into a language model, to obtain a plurality of candidate texts and first confidences corresponding to the respective candidate texts, wherein the language model is an automatic speech recognition (ASR) model; and taking a candidate text with a highest first confidence as a second text.

In an implementation, the inputting the first text into a semantic analysis model, to obtain intention information and slot information of the first text includes:

inputting the first text into the semantic analysis model to obtain a plurality of pieces of candidate intention information and second confidences corresponding to the respective pieces of candidate intention information, wherein the semantic analysis model is a natural language understanding (NLU) model;

taking candidate intention information with a highest second confidence as the intention information of the first text; and obtaining, from the first text, slot information corresponding to the intention information of the first text.

In an implementation, the inputting the intention information and the slot information of the first text into a conversation state machine, to obtain interaction information corresponding to the first text includes:

inputting the intention information and the slot information of the first text into an initial node of the conversation state machine;

selecting a conversation path that conforms to the intention information of the first text, in the conversation state machine;

searching for an intermediate node in the conversation path conforming to the intention information of the first text as a next node to be jumped to, according to the slot information of the first text; and returning interaction information by using the intermediate node.

In an implementation, the inputting the intention information and the slot information of the first text into a conversation state machine, to obtain interaction information corresponding to the first text further includes:

obtaining slot information in response information of the interaction information by using the semantic analysis model, in a case of receiving the response information; and inputting the slot information of the response information to a node next to an intermediate node of the conversation state machine.

In an implementation, a construction of the conversation state machine includes:

obtaining intention information of a training sample by using the semantic analysis model;

determining slot information corresponding to the intention information of the training sample; and constructing a conversation path included in the intention information, according to the slot information corresponding to the intention information.

In an implementation, the constructing a conversation path included in the intention information, according to the slot information corresponding to the intention information, includes:

extracting the slot information corresponding to the intention information of the training sample by using the semantic analysis model;

determining an initial node, an intermediate node and an end node of the conversation state machine, according to the slot information;

determining a jump relationship between respective nodes, according to the slot information; and constructing the conversation path included in the intention information of the training sample, according to the respective nodes and the jump relationship between the respective nodes.

In a second aspect, a conversation interaction apparatus is provided according to an embodiment of the application. The apparatus includes:

a speech conversion module, configured to convert a speech to be recognized into a first text;

an intention information and slot information obtaining module, configured to input the first text into a semantic analysis model, to obtain intention information and slot information of the first text; and an interaction information obtaining module, configured to input the intention information and the slot information of the first text into a conversation state machine, to obtain interaction information corresponding to the first text.

In an implementation, the apparatus further includes:

a candidate text and confidence obtaining module, configured to input the first text into a language model, to obtain a plurality of candidate texts and first confidences corresponding to the respective candidate texts, wherein the language model is an automatic speech recognition (ASR) model; and a second text obtaining module, configured to take a candidate text with a highest first confidence as a second text.

In an implementation, the intention information and slot information obtaining module includes:

a candidate intention information and confidence obtaining sub-module, configured to input the first text into a semantic analysis model to obtain a plurality of pieces of candidate intention information and second confidences corresponding to the respective pieces of candidate intention information, wherein the semantic analysis model is a natural language understanding (NLU) model;

a first text intention information obtaining sub-module, configured to take candidate intention information with a highest second confidence as the intention information of the first text; and a first slot information obtaining sub-module, configured to obtain, from the first text, slot information corresponding to the intention information of the first text.

In an implementation, the interaction information obtaining module includes:

an intention information and slot information input sub-module, configured to input the intention information and the slot information of the first text into an initial node of the conversation state machine;

a conversation path selection sub-module, configured to select a conversation path that conforms to the intention information of the first text, in the conversation state machine;

a jump node searching sub-module, configured to search for an intermediate node in the conversation path conforming to the intention information of the first text as a next node to be jumped to, according to the slot information of the first text; and an interaction information returning sub-module, configured to return interaction information by using the intermediate node.

In an implementation, the interaction information obtaining module further includes:

a second slot information obtaining sub-module, configured to obtain slot information in response information of the interaction information by using the semantic analysis model, in a case of receiving the response information; and a second slot information inputting sub-module, configured to input the slot information of the response information to a node next to an intermediate node of the conversation state machine.

In an implementation, a construction of the conversation state machine includes:

a training sample intention information obtaining module, configured to obtain intention information of a training sample by using the semantic analysis model;

a slot information determination module, configured to determine slot information corresponding to the intention information of the training sample; and a conversation path construction module, configured to construct a conversation path included in the intention information, according to the slot information corresponding to the intention information.

In an implementation, the conversation path construction module includes:

an information extraction sub-module, configured to extract the slot information corresponding to the intention information of the training sample by using the semantic analysis model;

a node determination sub-module, configured to determine an initial node, an intermediate node and an end node of the conversation state machine, according to the slot information;

a jump relation determination sub-module, configured to determine a jump relationship between respective nodes, according to the slot information; and a construction execution sub-module, configured to construct the conversation path included in the intention information of the training sample, according to the respective nodes and the jump relationship between the respective nodes.

In a third aspect, a conversation interaction apparatus is provided according to an embodiment of the present application. The functions of the apparatus may be implemented by using hardware or by corresponding software executed by hardware. The hardware or software includes one or more modules corresponding to the functions described above.

In a possible embodiment, the apparatus structurally includes a processor and a storage, wherein the storage is configured to store a program which supports the apparatus in executing the above method. The processor is configured to execute the program stored in the storage. The apparatus may further include a communication interface through which the apparatus communicates with other devices or communication networks.

In a fourth aspect, a computer-readable storage medium for storing computer software instructions used for a conversation interaction apparatus is provided. The computer readable storage medium may include programs involved in executing of the conversation interaction method described above.

One of the technical solutions above has the following advantages or beneficial effects: with a semantic analysis model, intention information and slot information of a first text are obtained directly from the first text. The process in the existing technology, where a semantic analysis model needs to be used immediately after a language model, is avoided, thereby shortening processing time and making it possible to respond faster to a user. Further, by using the above scheme, calculation complexity and the cost of a whole system are reduced.

Another one of the technical solutions above has the following advantages or beneficial effects: an automatic speech recognition ASR model and a natural language understanding NLU model are integrated together. A speech to be recognized is processed under an integration framework, so that a candidate text and candidate intention information with a highest total confidence may be output.

The above summary is provided only for illustration and is not intended to be limiting in any way. In addition to the illustrative aspects, embodiments, and features described above, further aspects, embodiments, and features of the present application will be readily understood from the following detailed description with reference to the accompanying drawings.

BRIEF DESCRIPTION OF THE DRAWINGS

In the drawings, unless otherwise specified, identical or similar parts or elements are denoted by identical reference numerals throughout the drawings. The drawings are not necessarily drawn to scale. It should be understood these drawings merely illustrate some embodiments of the present application and should not be construed as limiting the scope of the present application.

DETAILED DESCRIPTION OF THE EMBODIMENTS

Hereafter, only certain exemplary embodiments are briefly described. As can be appreciated by those skilled in the art, the described embodiments may be modified in different ways, without departing from the spirit or scope of the present application. Accordingly, the drawings and the description should be considered as illustrative in nature instead of being restrictive.

Figure 1:
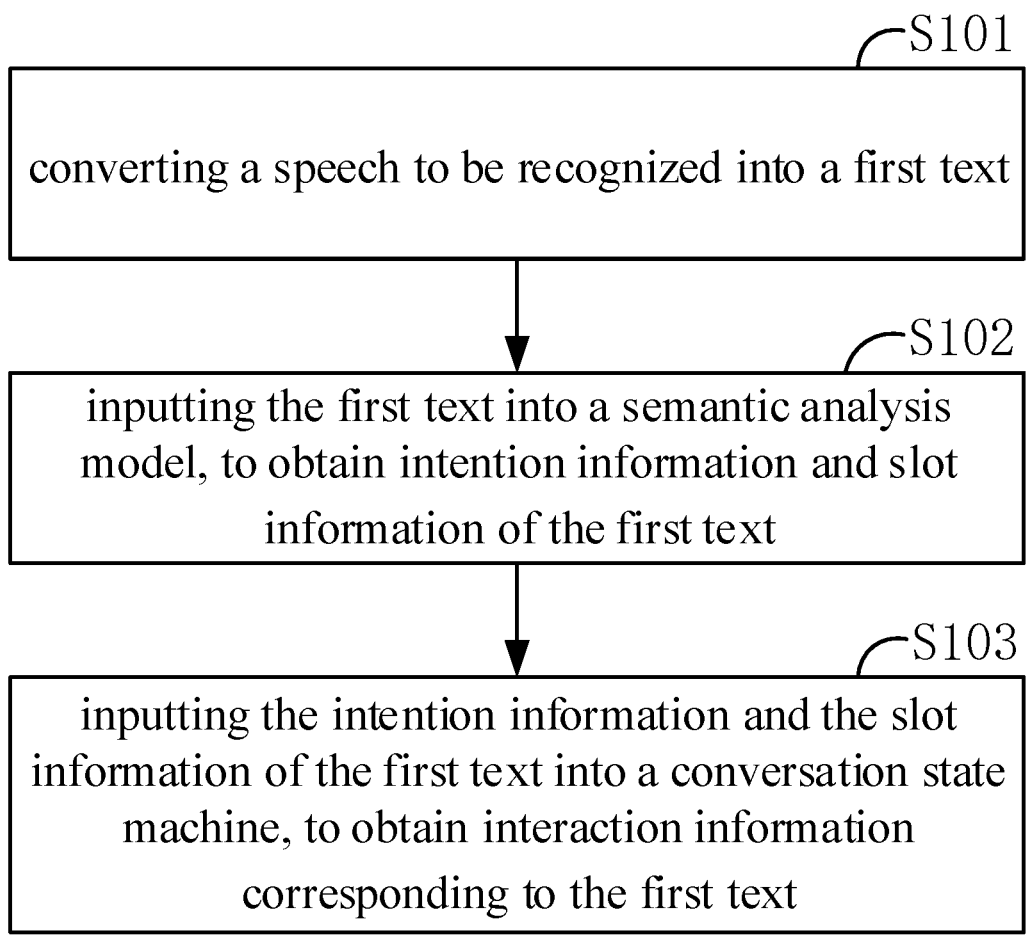
FIG. 1 is a flowchart showing a conversation interaction method according to an embodiment of the application.

FIG. 1 is a flowchart showing a conversation interaction method according to an embodiment of the application. As shown in FIG. 1, the method includes following steps.

At S101, a speech to be recognized is converted into a first text.

After receiving a speech to be recognized, a conversation terminal may recognize the speech to be recognized as a first text, by using an acoustic model. A conversation terminal may include an intelligent speaker, an intelligent robot, an intelligent mobile phone and other devices with human-computer interaction function.

At S102, the first text is input into a semantic analysis model, to obtain intention information and slot information of the first text.

A semantic analysis model may be used to extract intention information of a sentence included in the first text. Intention information may be a purpose of a sentence. One or more slot information corresponding to intention information may be included in the first text. For example, a first text may be one of "what's the weather like tomorrow", "check the weather", "check the weather in Beijing", and "check the weather in Beijing tomorrow". The intention information of the above first texts may correspond to "check the weather". The slot information corresponding to "check the weather" may include "time" and "location". For example, in a case where the first text is "what's the weather like tomorrow", the slot information "time" included in the first text is "tomorrow" and the slot information "location" is none. In a case where the first text is "check the weather", both the slot information "time" and "location" included in the first text are none. In a case where the first text is "check the weather in Beijing", the slot information "time" included in the first text is none, and the slot information "location" is Beijing. Further, in a case where the first text is "check the weather in Beijing tomorrow", then the slot information "time" included in the first text is tomorrow, and the slot information "location" is Beijing.

After the slot information "time" and "location" included in the first text are determined, corresponding weather information may be queried.

At S103, the intention information and the slot information of the first text are input into a conversation state machine, to obtain interaction information corresponding to the first text.

A conversation state machine may generate interaction information according to a current conversation state. The interaction information may be query result information corresponding to the first text or may be query information provided for the first text.

For example, in a case where the first text is "check the weather in Beijing tomorrow", the slot information included in the first text is complete, thus, interaction information corresponding to the first text obtained by the conversation state machine may be a query result about the tomorrow's weather in Beijing, which may be directly obtained. The query result may be obtained through a cloud server. For example, after determining an intention of a first text, a conversation terminal may communicate with a cloud server, to obtain a weather condition in Beijing tomorrow, and then output the weather condition to a user as interaction information. The output forms include speech output and/or text output.

For example, in a case where the first text is "what is the weather like tomorrow", and the slot information "location" included in the first text is none, the conversation state machine may generate interaction information for querying the "location". For example, interaction information may be "the weather in which location are you going to query?" Then, the sentence of "the weather in which location are you going to query?" is output to a user as interaction information.

Figure 2:
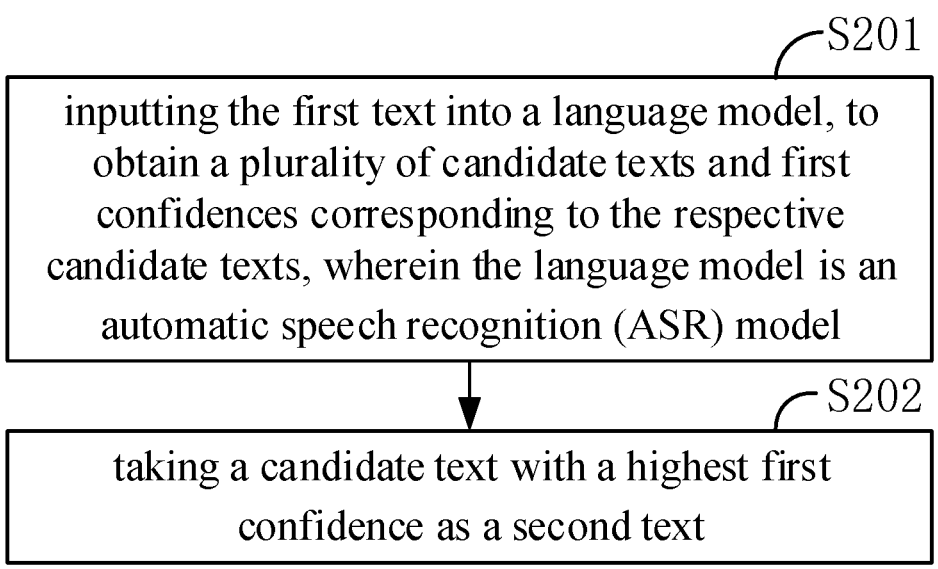
FIG. 2 is a flowchart showing a conversation interaction method according to an embodiment of the application.

As shown in FIG. 2, in an implementation, the method further includes following steps.

At S201, the first text is input into a language model, to obtain a plurality of candidate texts and first confidences corresponding to the respective candidate texts, wherein the language model is an automatic speech recognition (ASR) model.

At S202, a candidate text with a highest first confidence is taken as a second text.

A language model may be used to calculate the appearance probability of a sentence. For example, the first text is a sentence "how is the weather today", then, a calculation performed on this sentence by using a language model may include: performing a word segmentation on this sentence, to obtain three segments "today", "weather", and "how".

A first candidate text obtained may be "today/today:0.1 weather/weather:0.2 how/how:0.6". A second candidate text obtained may be "today/today:0.1 weather/climate: 0.08 how/what about: 0.4". A search path cumulative cost may be used to represent a first confidence. For example, taking the sum of the negative logarithm of the total weight of a search path as the search path cumulative cost, the search path cumulative cost of the first candidate text is expressed as $--\lg(0.1)-\lg(0.2)-\lg(0.6)\approx 0.91$. The search path cumulative cost of the second candidate text is expressed as $-\lg(0.1)-\lg(0.08)-\lg(0.4)\approx 2.49$.

By comparison, it may be concluded that the search path cumulative cost of the first candidate text is relatively small, which means that the confidence of the first candidate text is relatively high, therefore, the first candidate text may be selected as the second text. The second text may be displayed on a display device of the conversation terminal. A user can verify the recognition result of the conversation terminal by viewing the second text.

The language model may be an automatic speech recognition ASR model. The ASR model may further include an acoustic model, so that a received speech may be recognized, to obtain a plurality of candidate texts and first confidences corresponding to the respective candidate texts.

Figure 3:
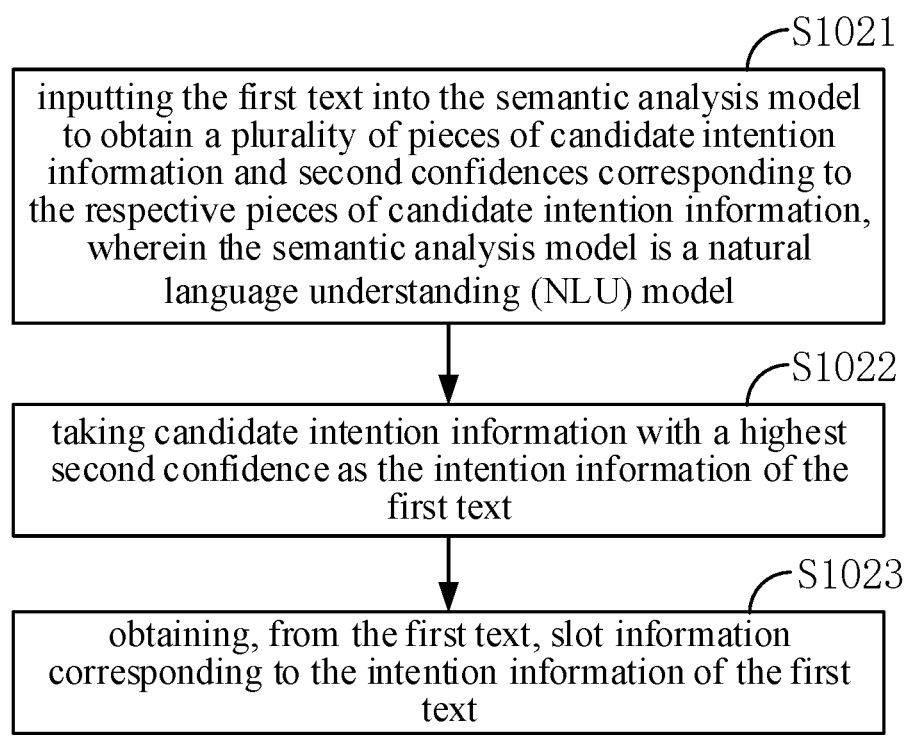
FIG. 3 is a flowchart showing a conversation interaction method according to an embodiment of the application.

As shown in FIG. 3, in an implementation, S102 includes following steps.

At S1021, the first text is input into the semantic analysis model to obtain a plurality of pieces of candidate intention information and second confidences corresponding to the respective pieces of candidate intention information, wherein the semantic analysis model is a natural language understanding (NLU) model.

At S1022, candidate intention information with a highest second confidence is taken as the intention information of the first text.

At S1023, slot information corresponding to the intention information of the first text is obtained from the first text.

Firstly, key information is extracted from the first text by using the semantic analysis model. Then, with models, such as a trained Deep Neural Network (DNN) or a Regular Expression, corresponding intention information and confidences thereof may be obtained based on the key information.

For example, the first text is the sentence "how is the weather today?" The extracted pieces of key information may include "today", "weather", "how", and the like. By inputting the above pieces of key information into a trained model, it may be concluded that the confidence of a piece of candidate intention information "check the weather" is 0.6, and the confidence of another piece of candidate intention information "query the time" is 0.2.

After a comparison of the confidences, the candidate intention information "check weather" may be taken as the intention information of the first text. Slot information corresponding to the intention information "check the weather" is then obtained, for example, the slot information may be "time" and "location".

A correspondence between the intention information and the slot information may be manually labeled, or correlated during a model training, so that slot information corresponding to different pieces of intention information may be determined.

In an implementation, an automatic speech recognition ASR model and a natural language understanding NLU model may be integrated together. Then, processing of a speech to be recognized may include: after the speech to be recognized is converted into a first text by using an acoustic model in the automatic speech recognition ASR model, the first text may be input into a language model and a natural language understanding NLU model integrated in the automatic speech recognition ASR model, to obtain a second text with a highest confidence and the intention information of the first text.

The obtaining a second text with a highest confidence and the intention information of the first text may include the following steps. The first text is input into a language model, to obtain a plurality of candidate texts and first confidences corresponding to the respective candidate texts. The first text is input into a semantic analysis model to obtain a plurality of pieces of candidate intention information and second confidences corresponding to the respective pieces of candidate intention information. Then, multiply the respective first confidences with the respective second confidences. A first confidence and a second confidence corresponding to the maximum of the multiplication results are determined. The candidate text corresponding to the determined first confidence and the candidate intention information corresponding to the determined second confidence are output.

Based on the scheme above, a subsequent recognition may be performed by the natural language understanding NLU model without an output from the automatic speech recognition ASR model. The automatic speech recognition ASR model and the natural language understanding NLU model are integrated together. A speech to be recognized is processed under an integration framework, so that a candidate text and candidate intention information with a highest total confidence may be output.

Figure 4:
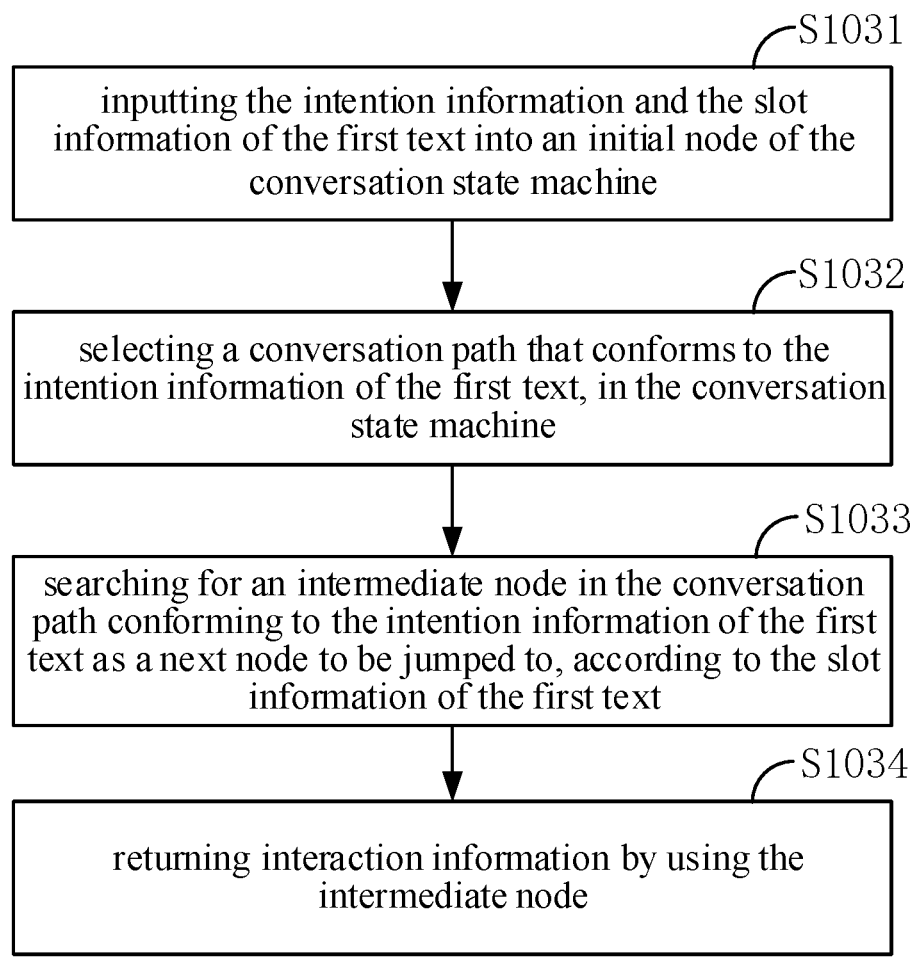
FIG. 4 is a flowchart showing a conversation interaction method according to an embodiment of the application.
Figure 5:
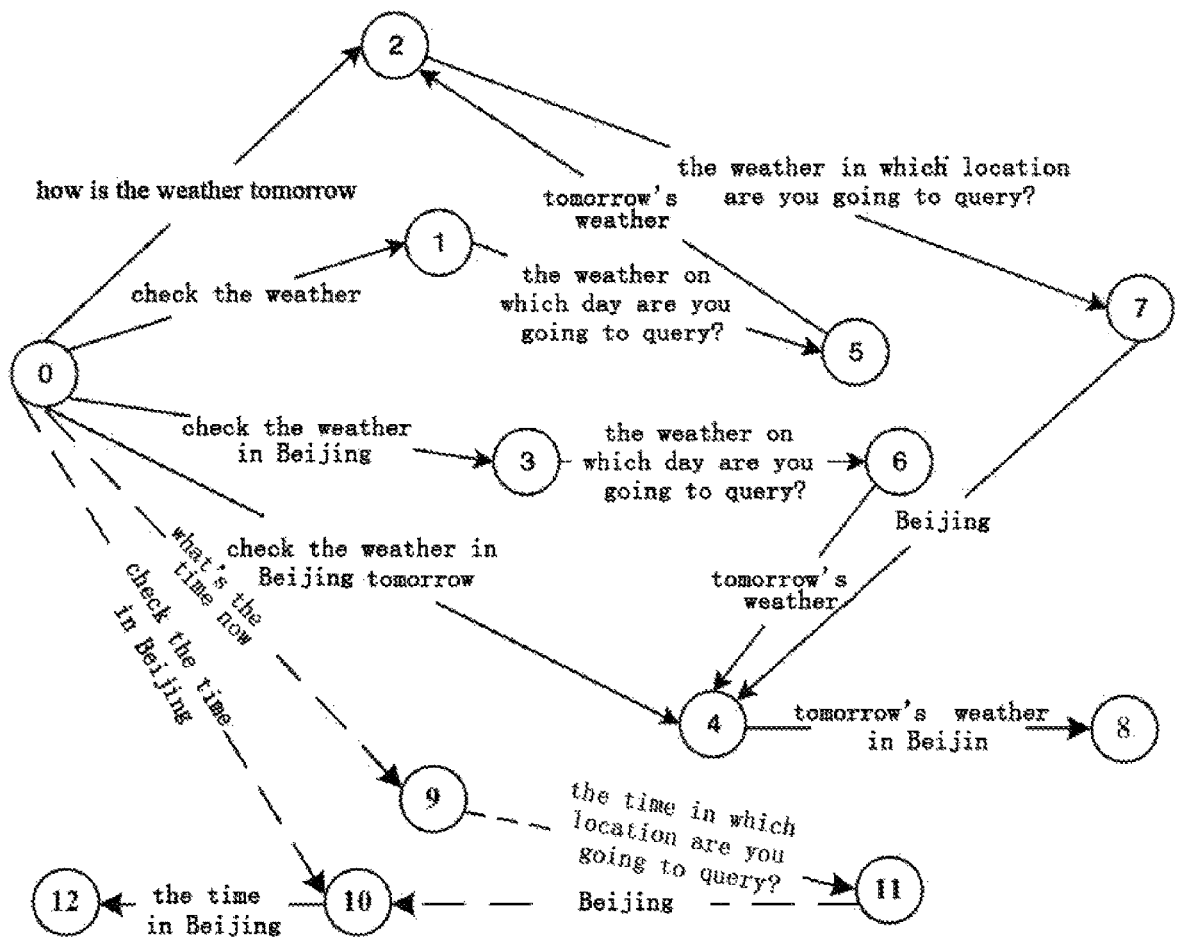
FIG. 5 is a schematic diagram showing a conversation state machine according to an embodiment of the application.

With reference to FIG. 4 and FIG. 5, in an implementation, S103 includes following steps.

At S1031, the intention information and the slot information of the first text are input into an initial node of the conversation state machine.

At S1032, a conversation path that conforms to the intention information of the first text, in the conversation state machine is selected.

At S1033, an intermediate node is searched for in the conversation path conforming to the intention information of the first text as a next node to be jumped to, according to the slot information of the first text.

At S1034, interaction information is returned by using the intermediate node.

For example, the first text may be one of "how is the weather tomorrow", "check the weather", "check the weather in Beijing", and "check the weather in Beijing tomorrow". By using a semantic analysis model, it can be concluded that the intention information of the first text is "check the weather".

With reference to FIG. 5, the solid lines in the conversation state machine may correspond to conversation paths related to the intention information "check the weather". The dotted lines in the conversation state machine may correspond to conversation paths related to the intention information "query the time". The intention information and the slot information of the first text are input into an initial node of the conversation state machine (the node 0 in FIG. 5). Based on a recognition of the intention information of the first text, conversation paths that conform to the intention information "check the weather" may be selected. That is, the conversation paths are defined as the path from nodes 0 to node 1, the path node 0 from node 2, the path from node 0 to node 3, and the path from node 0 to node 4. For example, the intention information of the first text obtained by using a semantic analysis model is "query the time", the conversation paths are defined then as the path from node 0 to node 9 and the path from node 0 to node 10.

The conversation state machine jumps among the nodes of the conversation paths, according to the case whether slot information of the first text is none. For example, in the two pieces of slot information "time" and "location" corresponding to "how is the weather tomorrow", the slot information "location" is none. At node 2, interaction information used to obtain a "location" from a user may be output. Therefore, node 2 is search for in the conversation paths that conform to the intention information of the first text as a next node to be jumped to, and then the conversation path is determined as the path from the initial node 0 to the intermediate node 2. By using the intermediate node 2, the interaction information "the weather in which location are you going to query?" is returned to the user. The interaction information returned to the user may be output in various forms, such as a voice, a text, and an image.

Figure 6:
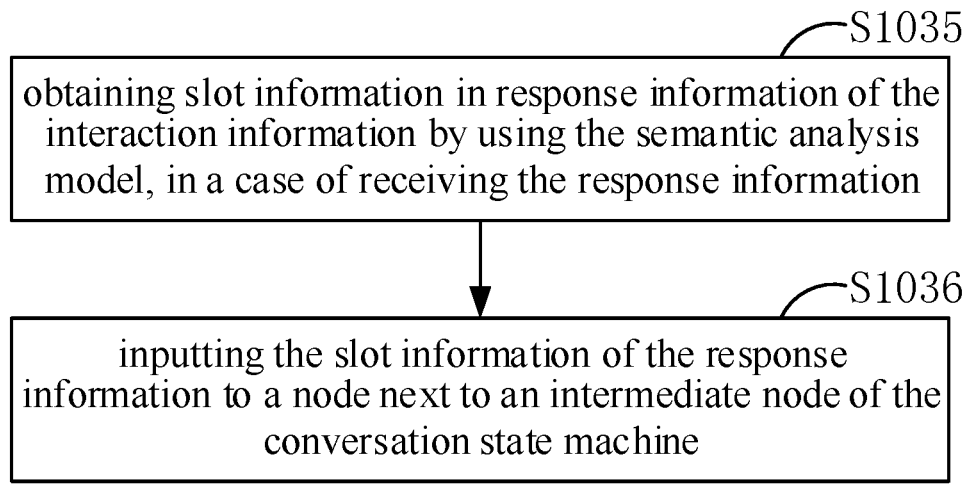
FIG. 6 is a flowchart showing a conversation interaction method according to an embodiment of the application.

With reference to FIG. 5 and FIG. 6, in an implementation, S103 further includes following steps.

At S1035, slot information in response information of the interaction information is obtained by using the semantic analysis model, in a case of receiving the response information.

At S1036, the slot information of the response information is input to a node next to an intermediate node of the conversation state machine.

Each time the conversation terminal returns a piece of interaction information, it may track the conversation to record the conversation. In a case where a user responds to the interaction information, the conversation terminal uses the semantic analysis model to obtain the slot information of the response information after receiving the response speech. With the slot information, jumps are performed in the conversation state machine. For example, after the interaction information "the weather in which location are you going to query?" is returned to a user at the intermediate node 2, the response information obtained from the user is "Beijing". By using the semantic analysis model, it may be concluded that the slot information corresponding to "Beijing" is "location". In combination with the conversation record, it may be determined that in a case where the intention information is "check the weather", both the slot information have been obtained, then the path may jump to node 4. In a case where the slot information corresponding to node 4 are complete, the path may jump to the end node 8, to finally output weather query information.

Figure 7:
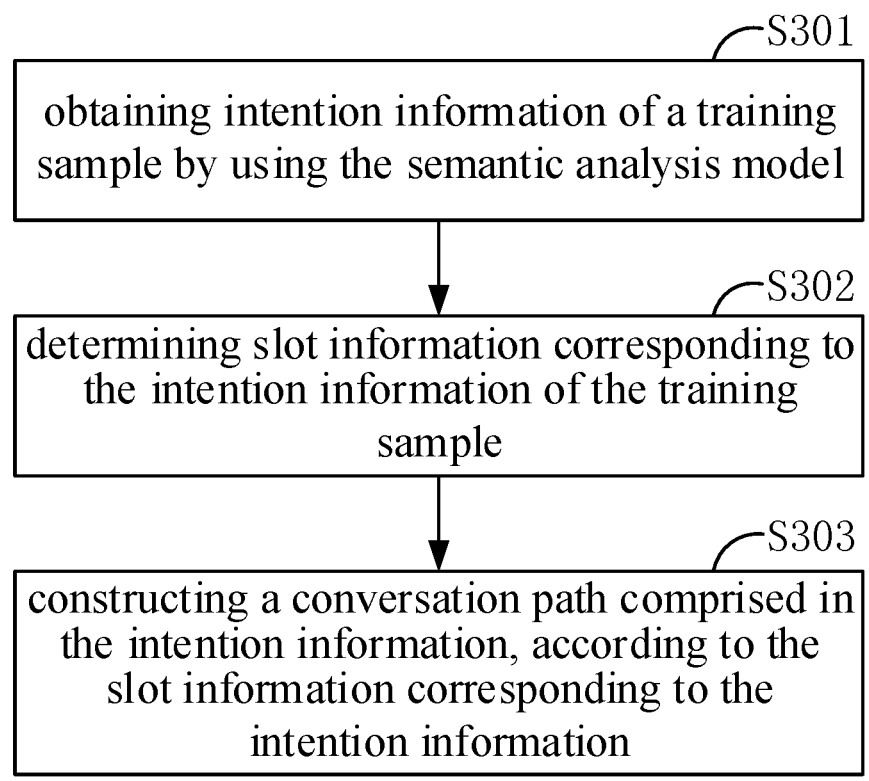
FIG. 7 is a flowchart showing a conversation interaction method according to an embodiment of the application.

As shown in FIG. 7, in an implementation, a construction of the conversation state machine includes following steps.

At S301, intention information of a training sample is obtained by using the semantic analysis model.

At S302, slot information corresponding to the intention information of the training sample is determined.

At S303, a conversation path included in the intention information is constructed according to the slot information corresponding to the intention information.

When determining the intention information of a training sample, different samples expressing a same intention may be used for training. For example, "how is the weather tomorrow", "what's the temperature tomorrow", "is it hot in Beijing", and the like may all express the same intention of "check the weather".

The slot information corresponding to the intention information may be set manually or through a model training. The purpose of constructing the conversation path included in the intention information is to generate interaction information according to the received speech, and to guide the user to complete all the slot information in the case of the current intention by using the interaction information, so that a query result may be finally provided by the conversation state machine.

Figure 8:
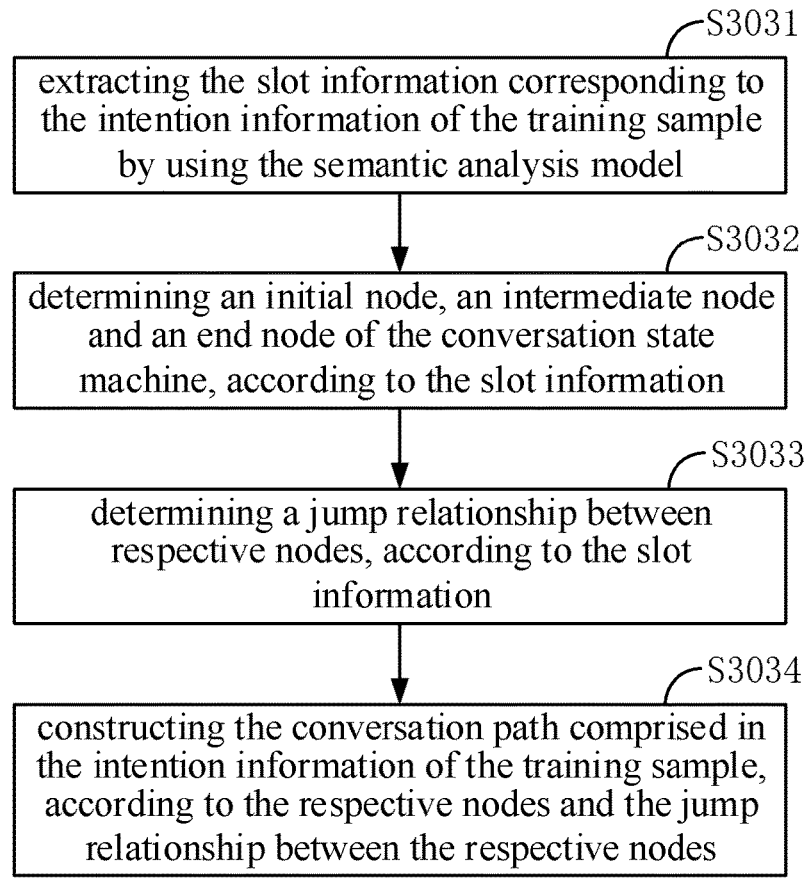
FIG. 8 is a flowchart showing a conversation interaction method according to an embodiment of the application.

As shown in FIG. 8, in an implementation, S303 includes following steps.

At S3031, the slot information corresponding to the intention information of the training sample is extracted by using the semantic analysis model.

At S3032, an initial node, an intermediate node and an end node of the conversation state machine are determined according to the slot information.

At S3033, a jump relationship between respective nodes is determined according to the slot information.

At S3034, the conversation path included in the intention information of the training sample is constructed according to the respective nodes and the jump relationship between the respective nodes.

For example, in a case where the intention information is "check the weather", the corresponding slot information may be "time" and "location". It may be expressed by following four scenarios.

The path from the initial node 0 to the intermediate node 4 indicates that the slot information "time" is with a piece of specific content and the slot information "location" is none.

The path from the initial node 0 to the intermediate node 2 indicates that the slot information "time" is with a piece of specific content and the slot information "location" is none; the path from the intermediate node 2 to the intermediate node 7 indicates that the interaction information for querying the "location" is generated; and the path from the intermediate node 7 to the intermediate node 4 indicates that both the slot information "time" and "location" are with specific content.

The path from the initial node 0 to the intermediate node 3 indicates that the slot information "time" is none and the slot information "location" is with a piece of specific content; the path from the intermediate node 3 to the intermediate node 6 indicates that the interaction information for querying the "time" is generated; and the path from the intermediate node 6 to the intermediate node 4 indicates that both the slot information "time" and "location" are with specific content.

The path from the initial node 0 to the intermediate node 1 indicates that both the slot information "time" and "location" are none; the path from the intermediate node 1 to the intermediate node 5 indicates that the interaction information for querying the "time" is generated; the path from the intermediate node 5 to the intermediate node 2 indicates that both the two pieces of slot information "time" at the intermediate node 5 and "time" at the intermediate node 2 are none; the path from the intermediate node 2 to the intermediate node 7 indicates that the interaction information for querying the "location" is generated; the path from the intermediate node 7 to the intermediate node 4 indicates that both the slot information "time" and "location" are with specific content.

The end node 8 may be taken as a final node for the weather result query.

Figure 9:
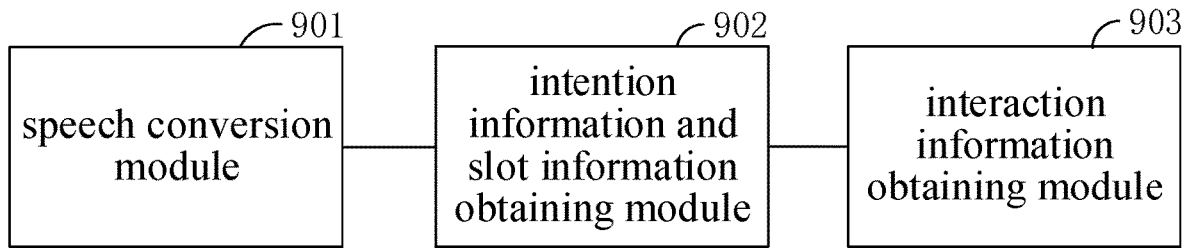
FIG. 9 is a structural block diagram showing a conversation interaction apparatus according to an embodiment of the application.

FIG. 9 is a structural block diagram showing a conversation interaction apparatus according to an embodiment of the application. As shown in FIG. 9, the apparatus includes:

a speech conversion module 901, configured to convert a speech to be recognized into a first text;

an intention information and slot information obtaining module 902, configured to input the first text into a semantic analysis model, to obtain intention information and slot information of the first text; and an interaction information obtaining module 903, configured to input the intention information and the slot information of the first text into a conversation state machine, to obtain interaction information corresponding to the first text.

Figure 10:
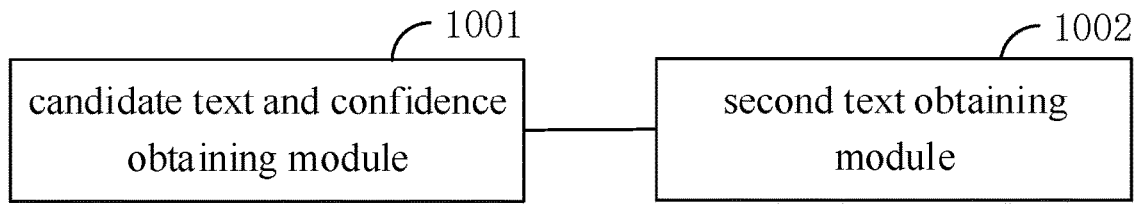
FIG. 10 is a structural block diagram showing a conversation interaction apparatus according to an embodiment of the application.

As shown in FIG. 10, in an implementation, the apparatus further includes:

a candidate text and confidence obtaining module 1001, configured to input the first text into a language model, to obtain a plurality of candidate texts and first confidences corresponding to the respective candidate texts, wherein the language model is an automatic speech recognition (ASR) model; and a second text obtaining module 1002, configured to take a candidate text with a highest first confidence as a second text.

Figure 11:
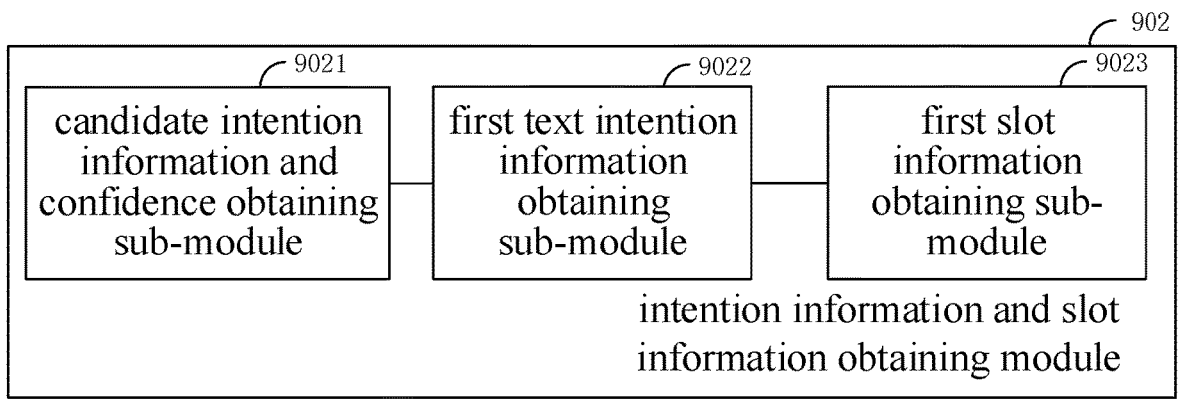
FIG. 11 is a structural block diagram showing a conversation interaction apparatus according to an embodiment of the application.

As shown in FIG. 11, in an implementation, the intention information and slot information obtaining module 902 includes:

a candidate intention information and confidence obtaining sub-module 9021, configured to input the first text into a semantic analysis model to obtain a plurality of pieces of candidate intention information and second confidences corresponding to the respective pieces of candidate intention information, wherein the semantic analysis model is a natural language understanding (NLU) model;

a first text intention information obtaining sub-module 9022, configured to take candidate intention information with a highest second confidence as the intention information of the first text; and a first slot information obtaining sub-module 9023, configured to obtain, from the first text, slot information corresponding to the intention information of the first text.

Figure 12:
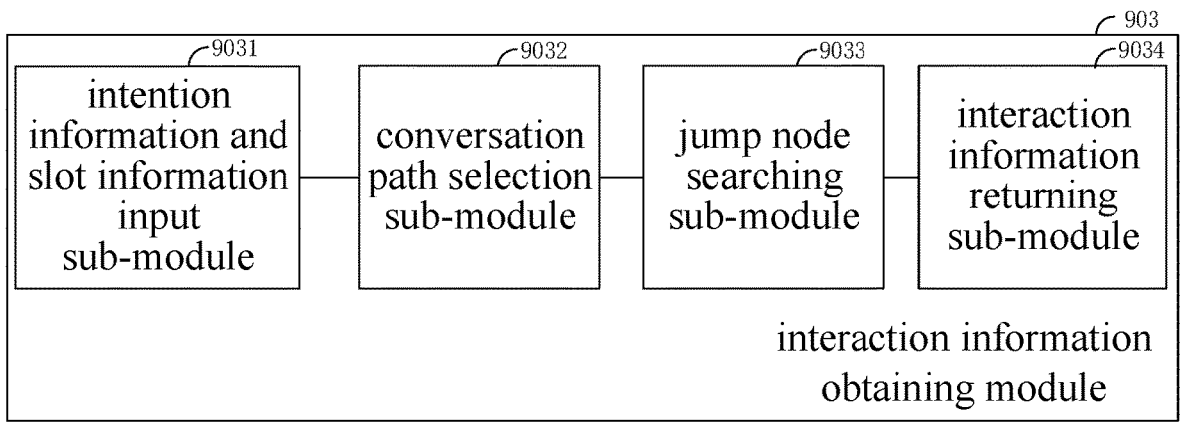
FIG. 12 is a structural block diagram showing a conversation interaction apparatus according to an embodiment of the application.

As shown in FIG. 12, in an implementation, the interaction information obtaining module 903 includes:

an intention information and slot information input sub-module 9031, configured to input the intention information and the slot information of the first text into an initial node of the conversation state machine;

a conversation path selection sub-module 9032, configured to select a conversation path that conforms to the intention information of the first text, in the conversation state machine;

a jump node searching sub-module 9033, configured to search for an intermediate node in the conversation path conforming to the intention information of the first text as a next node to be jumped to, according to the slot information of the first text; and an interaction information returning sub-module 9034, configured to return interaction information by using the intermediate node.

Figure 13:
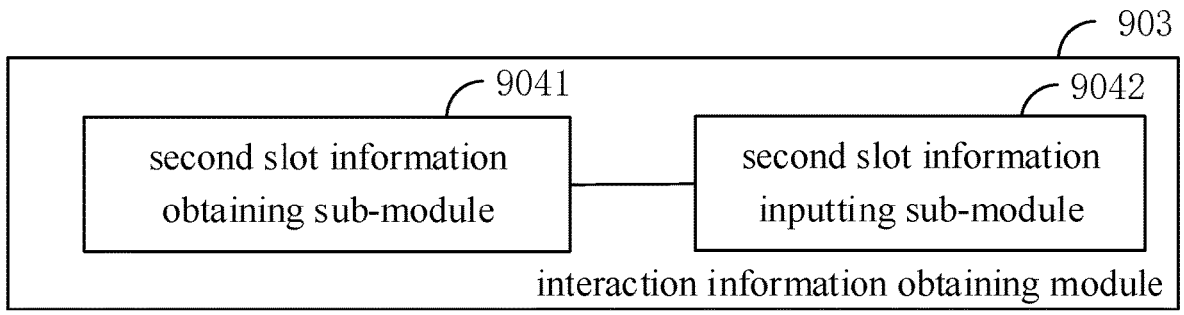
FIG. 13 is a structural block diagram showing a conversation interaction apparatus according to an embodiment of the application.

As shown in FIG. 13, in an implementation, the interaction information obtaining module 903 further includes:

a second slot information obtaining sub-module 9041, configured to obtain slot information in response information of the interaction information by using the semantic analysis model, in a case of receiving the response information;

a second slot information inputting sub-module 9042, configured to input the slot information of the response information to a node next to an intermediate node of the conversation state machine.

Figure 14:
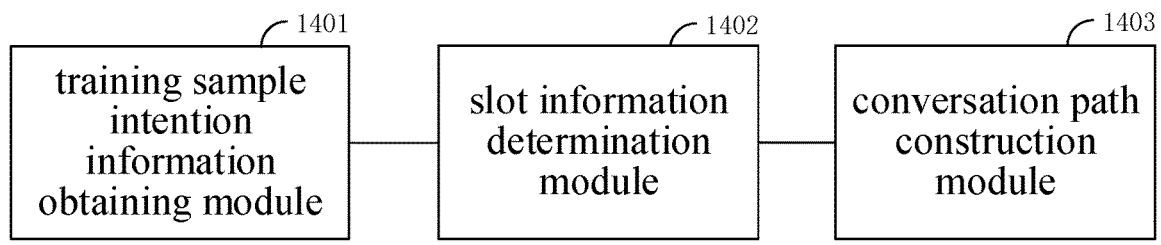
FIG. 14 is a structural block diagram showing a conversation interaction apparatus according to an embodiment of the application.

As shown in FIG. 14, in an implementation, a construction of the conversation state machine includes:

a training sample intention information obtaining module 1401, configured to obtain intention information of a training sample by using the semantic analysis model;

a slot information determination module 1402, configured to determine slot information corresponding to the intention information of the training sample; and a conversation path construction module 1403, configured to construct a conversation path included in the intention information, according to the slot information corresponding to the intention information.

Figure 15:
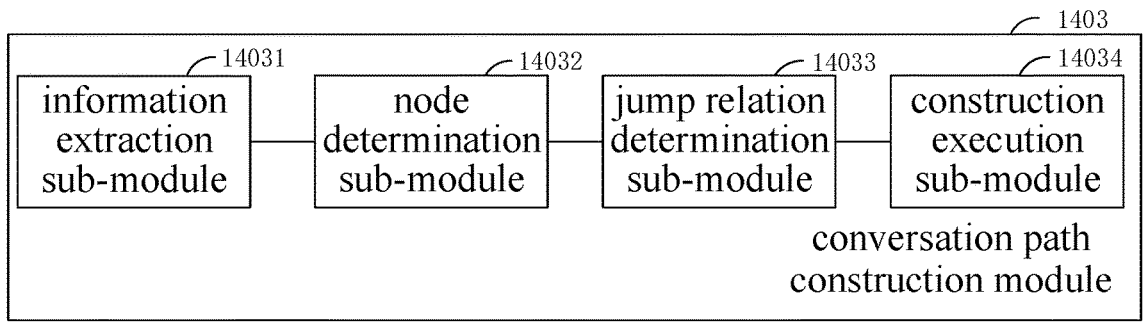
FIG. 15 is a structural block diagram showing a conversation interaction apparatus according to an embodiment of the application.

As shown in FIG. 15, in an implementation, the conversation path construction module 1403 includes:

an information extraction sub-module 14031, configured to extract the slot information corresponding to the intention information of the training sample by using the semantic analysis model;

a node determination sub-module 14032, configured to determine an initial node, an intermediate node and an end node of the conversation state machine, according to the slot information;

a jump relation determination sub-module 14033, configured to determine a jump relationship between respective nodes, according to the slot information; and a construction execution sub-module 14034, configured to construct the conversation path included in the intention information of the training sample, according to the respective nodes and the jump relationship between the respective nodes.

Figure 16:
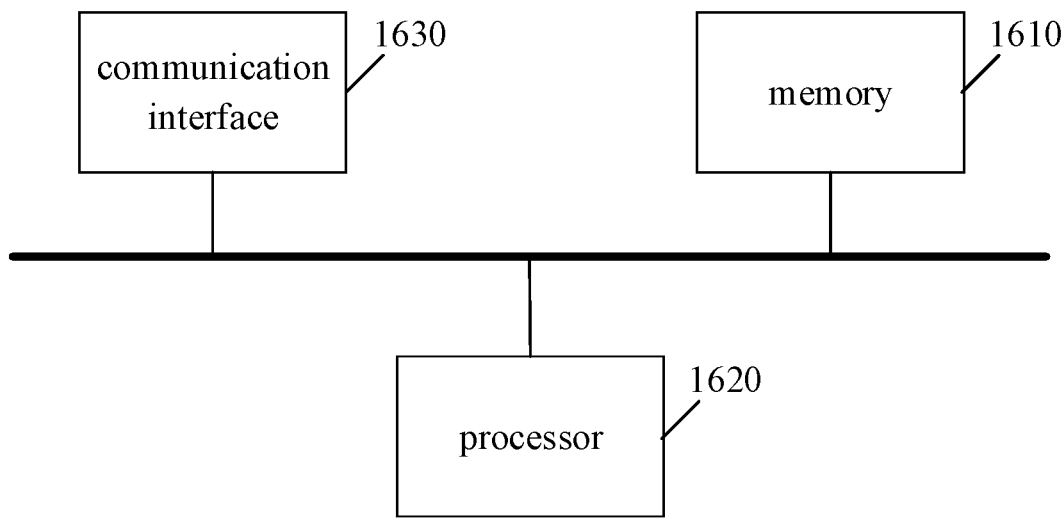
FIG. 16 is a structural block diagram showing a conversation interaction apparatus according to an embodiment of the application.

FIG. 16 is a structural block diagram showing a conversation interaction apparatus according to an embodiment of the application. As shown in FIG. 16, the apparatus includes a memory 1610 and a processor 1620, wherein a computer program that can run on the processor 1620 is stored in the memory 1610. The processor 1620 executes the computer program to implement the conversation interaction method in the abovementioned embodiment. The number of either the memory 1610 or the processor 1620 may be one or more.

The apparatus further includes:

a communication interface 1630 configured to communicate with an external device and exchange data.

The memory 1610 may include a high-speed RAM memory and may also include a non-volatile memory, such as at least one magnetic disk memory.

If the memory 1610, the processor 1620, and the communication interface 1630 are implemented independently, the memory 1610, the processor 1620, and the communication interface 1630 may be connected to each other via a bus to realize mutual communication. The bus may be an Industry Standard Architecture (ISA) bus, a Peripheral Component Interconnected (PCI) bus, an Extended Industry Standard Architecture (EISA) bus, or the like. The bus may be categorized into an address bus, a data bus, a control bus, and the like. For ease of illustration, only one bold line is shown in FIG. 16 to represent the bus, but it does not mean that there is only one bus or one type of bus.

Optionally, in a specific implementation, if the memory 1610, the processor 1620, and the communication interface 1630 are integrated on one chip, the memory 1610, the processor 1620, and the communication interface 1630 may implement mutual communication through an internal interface.

According to an embodiment of the application, it is provided a computer-readable storage medium having computer programs stored thereon. When executed by a processor, the programs implement the method described in the above embodiment.

In the description of the specification, the description of the terms "one embodiment," "some embodiments," "an example," "a specific example," or "some examples" and the like means the specific features, structures, materials, or characteristics described in connection with the embodiment or example are included in at least one embodiment or example of the present application. Furthermore, the specific features, structures, materials, or characteristics described may be combined in any suitable manner in any one or more of the embodiments or examples. In addition, different embodiments or examples described in this specification and features of different embodiments or examples may be incorporated and combined by those skilled in the art without mutual contradiction.

In addition, the terms "first" and "second" are used for descriptive purposes only and are not to be construed as indicating or implying relative importance or implicitly indicating the number of indicated technical features. Thus, features defining "first" and "second" may explicitly or implicitly include at least one of the features. In the description of the present application, "a plurality of" means two or more, unless expressly limited otherwise.

Any process or method descriptions described in flowcharts or otherwise herein may be understood as representing modules, segments or portions of code that include one or more executable instructions for implementing the steps of a particular logic function or process. The scope of the preferred embodiments of the present application includes additional implementations where the functions may not be performed in the order shown or discussed, including according to the functions involved, in substantially simultaneous or in reverse order, which should be understood by those skilled in the art to which the embodiment of the present application belongs.

Logic and/or steps, which are represented in the flowcharts or otherwise described herein, for example, may be thought of as a sequencing listing of executable instructions for implementing logic functions, which may be embodied in any computer-readable medium, for use by or in connection with an instruction execution system, device, or apparatus (such as a computer-based system, a processor-included system, or other system that fetch instructions from an instruction execution system, device, or apparatus and execute the instructions). For the purposes of this specification, a "computer-readable medium" may be any device that may contain, store, communicate, propagate, or transport the program for use by or in connection with the instruction execution system, device, or apparatus. The computer readable medium of the embodiments of the present application may be a computer readable signal medium or a computer readable storage medium or any combination of the above. More specific examples (not a non-exhaustive list) of the computer-readable media include the following: electrical connections (electronic devices) having one or more wires, a portable computer disk cartridge (magnetic device), random access memory (RAM), read only memory (ROM), erasable programmable read only memory (EPROM or flash memory), optical fiber devices, and portable read only memory (CDROM). In addition, the computer-readable medium may even be paper or other suitable medium upon which the program may be printed, as it may be read, for example, by optical scanning of the paper or other medium, followed by editing, interpretation or, where appropriate, process otherwise to electronically obtain the program, which is then stored in a computer memory.

It should be understood various portions of the present application may be implemented by hardware, software, firmware, or a combination thereof. In the above embodiments, multiple steps or methods may be implemented in software or firmware stored in memory and executed by a suitable instruction execution system. For example, if implemented in hardware, as in another embodiment, they may be implemented using any one or a combination of the following techniques well known in the art: discrete logic circuits having a logic gate circuit for implementing logic functions on data signals, application specific integrated circuits with suitable combinational logic gate circuits, programmable gate arrays (PGA), field programmable gate arrays (FPGAs), and the like.

Those skilled in the art may understand that all or some of the steps carried in the methods in the foregoing embodiments may be implemented by a program instructing relevant hardware. The program may be stored in a computer-readable storage medium, and when executed, one of the steps of the method embodiment or a combination thereof is included.

In addition, each of the functional units in the embodiments of the present application may be integrated in one processing module, or each of the units may exist alone physically, or two or more units may be integrated in one module. The above-mentioned integrated module may be implemented in the form of hardware or in the form of software functional module. When the integrated module is implemented in the form of a software functional module and is sold or used as an independent product, the integrated module may also be stored in a computer-readable storage medium. The storage medium may be a read only memory, a magnetic disk, an optical disk, or the like.

The foregoing descriptions are merely specific embodiments of the present application, but not intended to limit the protection scope of the present application. Those skilled in the art may easily conceive of various changes or modifications within the technical scope disclosed herein, all these should be covered within the protection scope of the present application. Therefore, the protection scope of the present application should be subject to the protection scope of the claims.

What is claimed is:

1. A conversation interaction method, comprising:
converting a speech to be recognized into a first text;
inputting the first text into a semantic analysis model, to obtain intention information and slot information of the first text; and inputting the intention information and the slot information of the first text into a conversation state machine, to obtain interaction information corresponding to the first text,
wherein a construction of the conversation state machine comprises:
obtaining intention information of a training sample by using the semantic analysis model;
determining slot information corresponding to the intention information of the training sample; and
constructing a conversation path comprised in the intention information, according to the slot information corresponding to the intention information,
wherein the constructing a conversation path comprised in the intention information, according to the slot information corresponding to the intention information, comprises:
extracting the slot information corresponding to the intention information of the training sample by using the semantic analysis model;
determining an initial node, an intermediate node and an end node of the conversation state machine, according to the slot information;
determining a jump relationship between respective nodes, according to the slot information; and
constructing the conversation path comprised in the intention information of the training sample, according to the respective nodes and the jump relationship between the respective nodes.

2. The conversation interaction method according to claim 1, further comprising:
inputting the first text into a language model, to obtain a plurality of candidate texts and first confidences corresponding to the respective candidate texts, wherein the language model is an automatic speech recognition (ASR) model; and
taking a candidate text with a highest first confidence as a second text.

3. The conversation interaction method according to claim 1, wherein the inputting the first text into a semantic analysis model, to obtain intention information and slot information of the first text comprises:
inputting the first text into the semantic analysis model to obtain a plurality of pieces of candidate intention information and second confidences corresponding to the respective pieces of candidate intention information, wherein the semantic analysis model is a natural language understanding (NLU) model;
taking candidate intention information with a highest second confidence as the intention information of the first text; and
obtaining, from the first text, slot information corresponding to the intention information of the first text.

4. The conversation interaction method according to claim 1, wherein the inputting the intention information and the slot information of the first text into a conversation state machine, to obtain interaction information corresponding to the first text comprises:
inputting the intention information and the slot information of the first text into an initial node of the conversation state machine;
selecting a conversation path that conforms to the intention information of the first text, in the conversation state machine;
searching for an intermediate node in the conversation path conforming to the intention information of the first text as a next node to be jumped to, according to the slot information of the first text;
returning interaction information by using the intermediate node.

5. The conversation interaction method according to claim 1, wherein the inputting the intention information and the slot information of the first text into a conversation state machine, to obtain interaction information corresponding to the first text further comprises:
obtaining slot information in response information of the interaction information by using the semantic analysis model, in a case of receiving the response information; and
inputting the slot information of the response information to a node next to an intermediate node of the conversation state machine.

6. A conversation interaction apparatus, comprising:
one or more processors; and
a storage device configured to store one or more programs, wherein
the one or more programs, when executed by the one or more processors, cause the one or more processors to:
convert a speech to be recognized into a first text;
input the first text into a semantic analysis model, to obtain intention information and slot information of the first text; and
input the intention information and the slot information of the first text into a conversation state machine, to obtain interaction information corresponding to the first text,
wherein the one or more programs, when executed by the one or more processors, cause the one or more processors further to:
obtain intention information of a training sample by using the semantic analysis model;
determine slot information corresponding to the intention information of the training sample; and
construct a conversation path comprised in the intention information, according to the slot information corresponding to the intention information,
wherein the one or more programs, when executed by the one or more processors, cause the one or more processors further to:
extract the slot information corresponding to the intention information of the training sample by using the semantic analysis model;
determine an initial node, an intermediate node and an end node of the conversation state machine, according to the slot information;
determine a jump relationship between respective nodes, according to the slot information; and
construct the conversation path comprised in the intention information of the training sample, according to the respective nodes and the jump relationship between the respective nodes.

7. The conversation interaction apparatus according to claim 6, wherein the one or more programs, when executed by the one or more processors, cause the one or more processors further to:
input the first text into a language model, to obtain a plurality of candidate texts and first confidences corresponding to the respective candidate texts, wherein the language model is an automatic speech recognition (ASR) model; and
take a candidate text with a highest first confidence as a second text.

8. The conversation interaction apparatus according to claim 6, wherein the one or more programs, when executed by the one or more processors, cause the one or more processors further to:
input the first text into a semantic analysis model to obtain a plurality of pieces of candidate intention information and second confidences corresponding to the respective pieces of candidate intention information, wherein the semantic analysis model is a natural language understanding (NLU) model;
take candidate intention information with a highest second confidence as the intention information of the first text; and
obtain, from the first text, slot information corresponding to the intention information of the first text.

9. The conversation interaction apparatus according to claim 6, wherein the one or more programs, when executed by the one or more processors, cause the one or more processors further to:
input the intention information and the slot information of the first text into an initial node of the conversation state machine;
select a conversation path that conforms to the intention information of the first text, in the conversation state machine;
search for an intermediate node in the conversation path conforming to the intention information of the first text as a next node to be jumped to, according to the slot information of the first text; and
return interaction information by using the intermediate node.

10. The conversation interaction apparatus according to claim 6, wherein the one or more programs, when executed by the one or more processors, cause the one or more processors further to:
obtain slot information in response information of the interaction information by using the semantic analysis model, in a case of receiving the response information;
input the slot information of the response information to a node next to an intermediate node of the conversation state machine.

11. A non-transitory computer-readable storage medium comprising computer programs stored thereon, wherein the programs, when executed by a processor, cause the processor to:
convert a speech to be recognized into a first text;
input the first text into a semantic analysis model, to obtain intention information and slot information of the first text; and
input the intention information and the slot information of the first text into a conversation state machine, to obtain interaction information corresponding to the first text,
wherein the programs, when executed by the processor, cause the processor to:
obtain intention information of a training sample by using the semantic analysis model;
determine slot information corresponding to the intention information of the training sample; and
construct a conversation path comprised in the intention information, according to the slot information corresponding to the intention information,
wherein the programs, when executed by the processor, cause the processor to:
extract the slot information corresponding to the intention information of the training sample by using the semantic analysis model;
determine an initial node, an intermediate node and an end node of the conversation state machine, according to the slot information;
determine a jump relationship between respective nodes, according to the slot information; and
construct the conversation path comprised in the intention information of the training sample, according to the respective nodes and the jump relationship between the respective nodes.

12. The non-transitory computer-readable storage medium according to claim 11, wherein the programs, when executed by the processor, cause the processor to:
input the first text into a language model, to obtain a plurality of candidate texts and first confidences corresponding to the respective candidate texts, wherein the language model is an automatic speech recognition (ASR) model; and
take a candidate text with a highest first confidence as a second text.

13. The non-transitory computer-readable storage medium according to claim 11, wherein the programs, when executed by the processor, cause the processor to:
input the first text into the semantic analysis model to obtain a plurality of pieces of candidate intention information and second confidences corresponding to the respective pieces of candidate intention information, wherein the semantic analysis model is a natural language understanding (NLU) model;
take candidate intention information with a highest second confidence as the intention information of the first text; and
obtain, from the first text, slot information corresponding to the intention information of the first text.

14. The non-transitory computer-readable storage medium according to claim 11, wherein the programs, when executed by the processor, cause the processor to:
input the intention information and the slot information of the first text into an initial node of the conversation state machine;
select a conversation path that conforms to the intention information of the first text, in the conversation state machine;
search for an intermediate node in the conversation path conforming to the intention information of the first text as a next node to be jumped to, according to the slot information of the first text;
return interaction information by using the intermediate node.

15. The non-transitory computer-readable storage medium according to claim 11, wherein the programs, when executed by the processor, cause the processor to:
obtain slot information in response information of the interaction information by using the semantic analysis model, in a case of receiving the response information; and
input the slot information of the response information to a node next to an intermediate node of the conversation state machine.

* * * * *